United States Patent [19]

Kock et al.

[11] Patent Number: 4,977,826
[45] Date of Patent: Dec. 18, 1990

[54] FLUID IMPINGEMENT METHOD & APPARATUS FOR FRUIT MEAT EXTRACTION

[75] Inventors: Ronald W. Kock, Wyoming, Ohio; Peter G. Gosselin, Springfield, Mass.; H. Norman Reiboldt, College Corner, Ohio

[73] Assignee: The Procter & Gamble Company, Cincinnati, Ohio

[21] Appl. No.: 320,344

[22] Filed: Mar. 8, 1989

[51] Int. Cl.$^5$ .............................................. A23N 4/24
[52] U.S. Cl. ...................................... 99/516; 99/538; 99/584
[58] Field of Search ................. 99/487, 495, 502, 504, 99/516, 536, 537, 538, 552, 584, 540; 426/475, 481, 489

[56] References Cited

U.S. PATENT DOCUMENTS

| | | | |
|---|---|---|---|
| 1,982,741 | 5/1930 | Keenan | 146/3 |
| 2,510,679 | 6/1950 | Bruce | 99/155 |
| 2,985,050 | 5/1961 | Schwacha | 83/177 |
| 3,246,993 | 4/1966 | Webster et al. | 99/193 |
| 4,129,068 | 12/1978 | McKenzie | 99/538 |
| 4,246,838 | 1/1981 | Pulver et al. | 83/177 |
| 4,254,157 | 3/1981 | Hannan, Jr. | 426/616 |
| 4,294,861 | 10/1981 | Ifuku et al. | 426/475 |
| 4,300,448 | 11/1981 | Hayashi et al. | 99/516 |
| 4,301,719 | 11/1981 | Gerow | 99/584 |
| 4,376,409 | 3/1983 | Belk | 99/509 |
| 4,421,021 | 12/1983 | Holbrook | 99/504 |
| 4,470,345 | 9/1984 | Miyata | 99/516 |
| 4,530,278 | 7/1985 | Sarig et al. | 99/547 |
| 4,560,572 | 12/1985 | Watanabe | 426/616 |
| 4,738,194 | 4/1988 | Ando et al. | 99/537 |
| 4,765,233 | 8/1988 | Genchev et al. | 99/472 |
| 4,774,097 | 9/1988 | Bushman et al. | 426/489 |

Primary Examiner—Timothy F. Simone
Attorney, Agent, or Firm—Michael E. Hilton; John V. Gorman; Richard C. Witte

[57] ABSTRACT

Method of an apparatus for extracting whole juice sacs from citrus fruits by fluid impinging chunks of peeled fruit meat. In one embodiment, a fruit chunk is fed into a fluid impingement chamber that includes a plurality of off-center orifices. High-pressure fluid emitted from the orifices strikes the fruit chunk and spins it such that the fruit chunk's juice sacs are stripped from the chunk's sectional membranes. In another preferred embodiment, a plurality of fluid impingement chambers are incorporated into a high-speed, continuous motion turret. In yet another preferred embodiment, fruit chunks are fed into an inclined tube that includes fluid orifices which emit high pressure fluid. Controlling the fluid pressure, nozzle orifice size, number of orifices, direction of fluid jets, impingement time, and size and shape of the fruit chunks determine how substantially the radial membranes of fruit chunks are stripped of juice sacs without shredding the membranes. By avoiding contamination by or commingling with flavor-deteriorating membranes or peel components of fruits, the resulting juice and juice sac slurry has a taste more like fresh-squeezed juice after further processing and storage than current commercially-made juice.

11 Claims, 6 Drawing Sheets

FLUID IMPINGEMENT METHOD & APPARATUS FOR FRUIT MEAT EXTRACTION

FIELD OF THE INVENTION

The present invention relates to extracting the edible components of a fruit, and more particularly to methods of and apparatuses for extracting whole juice sacs from citrus fruits. Even more particularly, the present invention relates to fluid impingement methods of and apparatuses for separating whole juice sacs from the sectional membranes of citrus fruits.

BACKGROUND OF THE INVENTION

Various fruit juices and beverages that contain fruit o components are popular because of their appealing taste and because they are perceived as being natural and nutritious. Commercially extracted and packaged fruit juices are more widely consumed than hand-squeezed juice primarily because commercial juice is much more convenient. However, it has been found that many consumers prefer the taste and texture of hand-squeezed juice over commercially processed juice. Accordingly, a principle object of the present invention is to commercially extract the edible components of a fruit in such a way that the resulting juice has a taste and texture similar to that of hand-squeezed juice.

Citrus fruits such as oranges and grapefruits basically consist of an outer colored peel (flavedo), an inner white spongy peel (albedo), a fibrous membrane just inside the albedo, and an inner meat portion formed in wedge-shaped segments that are separated by fibrous membranes extending radially from a stem. The stem is a pulpy core that typically contains several large and small seeds. The individual meat segments primarily consist of juice sacs, which are elongated teardrop-shaped bags that contain the fruit juice, that are held together by an epicuticular wax. The fruit's juice sacs and the juice from these sacs are generally considered to be the most desirable components for human consumption. The fruit's other components, such as the peel, membranes, stem, and seeds, are useful for other applications such as cattle feed.

It has been found that the method used to extract the edible components of a fruit greatly influences the taste, texture, and overall quality of the final product. During hand squeezing, the consumer either intuitively or because of physical limitations presses lightly on the fruit to extract the juice along with mostly ruptured juice sacs. Even though this juice is sometimes mixed with some shredded membranes and seeds, it is typically consumed almost immediately. In a commercial environment, it has been found that the less contact between the fruit juice and the fruit's undesirable flavor-containing components, the better tasting the juice product. This is believed to be because commercially processed juice is not consumed immediately and because it is generally exposed to considerable heat during pasteurization. When juice and undesirable flavor containing components such as seeds and membranes are intermixed and exposed to heat and time, the result does not taste like hand-squeezed juice.

Most production machinery used today for extracting juice from fruits can perhaps be most accurately characterized as fruit smashers. In general, these machines break the fruit into its various components and subsequently separate the juice by forceful screening. For example, the apparatus disclosed in U.S. Pat. No. 4,700,620 and leased by the FMC Corporation mashes the entire fruit, which ruptures essentially all of the juice sacs, while abrading and commingling the fruit's components as the juice is filtered therefrom.

Another type of apparatus used in the commercial juice extracting industry can be characterized as a reamer, examples of which are disclosed in U.S. Pat. Nos. 2,737,989 to Wurgaft and 4,479,424 to Carroll. In a basic reaming operation, the fruit is first cut in half, followed by pressing a reaming element into the exposed fruit meat, which ruptures the juice sacs and releases the juice. However, the reaming element also squeezes the fruit's peel, membranes, and seeds and thereby releases the undesirable flavor elements found in these fruit components, which results in poor tasting juice. In addition, the fruit's radial membranes tend to fold over onto themselves when the reamer both presses and rotates against them which makes it extremely difficult for the reamer to extract the fruit meat deep within the fruit half. Because of the need for high juice yields in commercial processes, reamers are usually pressed very hard into the fruit which further aggravates the problem.

Another type of commercial fruit meat extraction method and apparatus is generally referred to as a peeler, an example of which is disclosed in U.S. Pat. No. 3,700,017 to Vincent et al. In such a system, hand oriented fruit is placed between two spikes that are sharply shoved into the stem ends of the peel. The spikes are then rotated to spin the fruit past knives that move laterally across the fruit circumference to cut the peel from the meat. It has been found that slicing the peel into narrow strips in this fashion releases a substantial amount of undesirable peel oil from the peel which contaminates the fruit meat. In addition, peeling techniques typically require a strong spike/peel connection to maintain adequate peeling torque. This in turn requires a speed-limiting and therefore costly hand-orienting step to insert the spike near the fruit stem where the peel thickness is greatest. Non-spherical fruits such as those dented during shipping further complicate a peeling operation. Specifically, at reasonable production rates, either some peel is left on the meat or some of the meat is removed with the peel, thereby creating a tradeoff between contamination and meat yield. Ultimately, peeled balls of fruit meat must be further processed to separate the juice from the membranes, stems, and seeds. A belt press may be used for this purpose wherein the belts act as both a transporter of fruit balls and as a screen for filtering the juice from the fruit ball's membranes, stem, and seeds. Here again, essentially all of the juice sacs are ruptured.

Another type of known extraction system involves using various chemical baths such as alkali/phosphate and acid to dissolve the circumferential and sectional membranes from peeled fruit balls. Two examples are disclosed in U.S. Pat. No. 4,560,572 to Watanabe and U.S. Pat. No. 4,139,651 to Sekiguchi. However, it is believed that these systems would be unattractive for making juice in a commercial environment because of the high costs associated with the necessary chemicals and the inherent throughput rate limitation. In addition, it is believed that the chemicals used in these processes would have a major adverse effect on the fruit juice's taste and texture.

Still another extraction technique involves using high pressure fluid jets, examples of which include U.S. Pat.

Nos. 1,982,741 to Keenan; 4,294,861 to Ifuku et al.; and 4,300,448 to Hyashi et al. Generally, this type of system includes the steps of orienting the fruit so that it can be cut in half perpendicular to the stem, and placing the exposed fruit meat in front of a fluid jet nozzle. High pressure fluid emitted from the nozzle blasts the fruit meat from the peel. Although unruptured juice sacs can be obtained by using this process, the fruit's sectional membranes tend to fold over onto themselves and thereby impede the fluid jet's ability to remove the meat deepest within the peel. As a result, fluid pressures high enough to strip away the membranes as well as the juice sacs are required. At such pressure, the fluid ruptures many of the juice sacs and also tend to shred the fruit's sectional membranes. The juice slurry which results cannot easily be cleaned of membrane contaminants without also eliminating the desirable unruptured juice sacs. In addition, the orienting step is a critical process speed limiter because there is believed to be no reliable automated way to orient a substantially round citrus fruit.

In light of the above, the principal object of the present invention is to extract juice sacs and juice from a fruit with as little membrane and peel oil contamination as possible such that even after further processing, packaging and storage, the resulting juice product will have a taste similar to that of hand-squeezed juice.

Another principal object of the present invention is to extract fruit juice sacs from a fruit without rupturing a substantial portion of the fragile juice sacs and without shredding the fruit's sectional membranes so that the juice sacs can be readily separated from the membranes.

Yet another object of the present invention is to achieve high juice sac and edible fruit meat yields in a commercial environment.

Still another object of the present invention is to extract a portion of the available whole juice sacs from a fruit without disturbing the fruit's seeds to avoid a further process step of separating the seeds from the whole juice sacs.

SUMMARY OF THE INVENTION

In practicing the present invention, the internal fruit meat section is extracted from whole fruits by either a hemispherical or a spherical coring process or by careful hand peeling to produce chunks of fruit meat that have substantially all of their outer peels and membranes removed. A particularly preferred method of and apparatus for obtaining such fruit meat chunks is disclosed in commonly-assigned, copending U.S. patent application Ser. No. 291,920 entitled "Method of and Apparatus for Extracting Fruit Meat and Juice from a Fruit", filed Dec. 29, 1988, and incorporated herein by reference. Substantially spherical fruit chunks are produced by this spherical coring method which can then be individually fed by hand or automatically choke fed from a chute into the present juice sac extraction invention.

In one embodiment of the present invention, individual fruit chunks are inserted into a fluid impingement chamber by hand. A pressurized fluid is then injected through orifices in the chamber's side walls and directed into the fruit chunk. Each orifice is preferably offset from the chamber's centerline such that the stream of fluid both spins and impinges the fruit chunk. It is believed that the impinging fluid momentum loosens and separates the juice sacs from the fruit chunk's radially-oriented sectional membranes. By controlling the fluid's pressure and the impingement exposure time, substantially all of the juice sacs are stripped from the membranes while the membranes remain intact and attached to the central stem of the fruit chunk. Alternatively, a lower fluid pressure and/or shorter impingement exposure time may allow the outer juice sacs to be stripped away without removing the inner juice sacs that surround the fruit chunk's seeds near the stem.

One or both ends of the fluid impingement chamber are open to allow the stripped juice sacs to be flushed out and collected. Preferably, the open end of the chamber is covered with a screen member to retain the remaining portion of the fruit chunk within the chamber, thereby effectively separating the stripped juice sacs from the fruit chunk membranes. When the stripping process is completed, one screen is removed from one end of the chamber to allow the remaining fruit chunk portion to be removed.

The fluid used in the present invention may be a liquid, a gas, or a combination of the two, e.g., water and/or compressed air. Both fluids function substantially the same at the same pressure and orifice configuration when applied to orange juice sac extraction. Filtered compressed air is preferred, however, because it is more readily separated from the juice sacs and juice.

An alternative to the above embodiment has no orifices in the sidewalls of the chamber. Instead, at least one stream of fluid is injected into the chamber through a screened end of the chamber by means of an external nozzle. In yet another alternative embodiment, fluid is injected into the chamber from orifices through the sidewalls and from nozzles located at the screened end of the chamber.

In a particularly preferred embodiment of the present invention, a plurality of fluid impingement chambers are oriented in an equally spaced, parallel axis, circular pattern in a rotating wheel or turret. Fluid is distributed from a central source to each chamber as the wheel rotates. With a vertical wheel axis and a screen member located at the lower end of each fluid impingement chamber, gravity and the flow of fluid flush the stripped juice sacs away from the chambers and into a collection tank.

In the rotating wheel configuration of the present invention, each chamber is loaded with a fruit chunk through its upper open end as it passes under a fixed-position external feeding device. The upper ends are then sequentially closed with coverplates followed by injecting a high pressure fluid into each chamber for a given time as the wheel continues to rotate. Each chamber is then sequentially emptied at a fixed position prior to reloading, thereby providing a continuous process. The number of chambers in the wheel, their spacing, and the speed of wheel rotation determine the number of fruit chunks per minute which can be processed. For example, using compressed air as the fluid, 2 inch (5.1 cm) diameter Valencia orange chunks, and a 20 chamber wheel, a process rate of over 200 fruit chunks per minute can be achieved. The resulting slurry of juice and juice sacs are substantially uncontaminated by membrane pieces and the weight ratio of juice sac solids to juice is approximately 60:40.

In still another preferred embodiment of the present invention, fruit chunks are dropped one at a time into the upper end of an open impingement tube. The tube is inclined so that the chunks predictably roll or slide down one side of the tube at a relatively constant speed.

Pressurized fluid is injected into the tube from orifices spaced along the tube's length. The orifices are preferably staggered from one side of the tube to the other and angled relative to the tube's axis to cause the fruit chunks to spin as they move past the orifices. The tube is essentially one impingement chamber in which the fruit chunks translate as well as rotate. The time for one fruit chunk to translate through the full length of the tube is typically less than that required for all of the juice sacs to be stripped from the fruit chunk's membranes. This embodiment is therefore intended primarily where only partial juice sac extraction is desired to avoid extracting the seeds along with the juice sacs. Several fruit chunks may be passed through the impingement tube simultaneously, but preferably separated from each other so as not to inhibit rotation of each chunk.

A horizontal, screen-like conveyor is located at the impingement tube's discharge end onto which the stripped juice sacs and remaining portions of the fruit chunks are deposited. The juice and juice sacs pass through the screen-like conveyor and into a stationary collection hopper. The remaining portions of the fruit chunks, which consist of radial membranes, stems, and large seeds, cannot pass through the screen-like conveyor surface and instead are collected at the head pulley end of the conveyor by a separate collection hopper. A second stream of fluid directed onto the conveyor from above helps to flush already stripped juice sacs from the remaining portions of the fruit chunks and from the surface of the conveyor.

DETAILED DESCRIPTION OF THE INVENTION

The fluid impingement methods and apparatuses described hereinafter process chunks of fruit meat that have been extracted from whole fruits. The most preferred method and apparatus used for extracting chunks of fruit meat from whole fruits is disclosed in commonly-assigned, copending U.S. patent application Ser. No. 291,920 which was filed on Dec. 29, 1988 and is hereby incorporated herein by reference. Briefly, a whole fruit is grasped between two resilient cups and rotated while a grooving blade is brought into tangential contact with the fruit's outer peel which cuts a groove therein. Next, a hemispherical coring blade is inserted into the groove and rotated, which cleanly severs a substantially spherical chunk of fruit meat from the fruit's outer peel and outer peripheral membrane. Fruit meat chunks obtained in this fashion are particularly preferred in practicing the present invention because the fruit chunk's sectional membranes (rag) are firmly attached to the central stem and therefore will not easily break away when the chunk is subjected to fluid pressure as will be more fully explained hereinafter.

The present invention can also be practiced with fruit meat chunks obtained in other ways such as that disclosed in commonly-assigned, copending U.S. patent application Ser. No. 202,172, which was filed on June 3, 1988 and is hereby incorporated herein by reference. Other methods include hand-peeling, machine peeling, or using chemical baths to remove the fruit's outer peel.

Figures 1, 2:
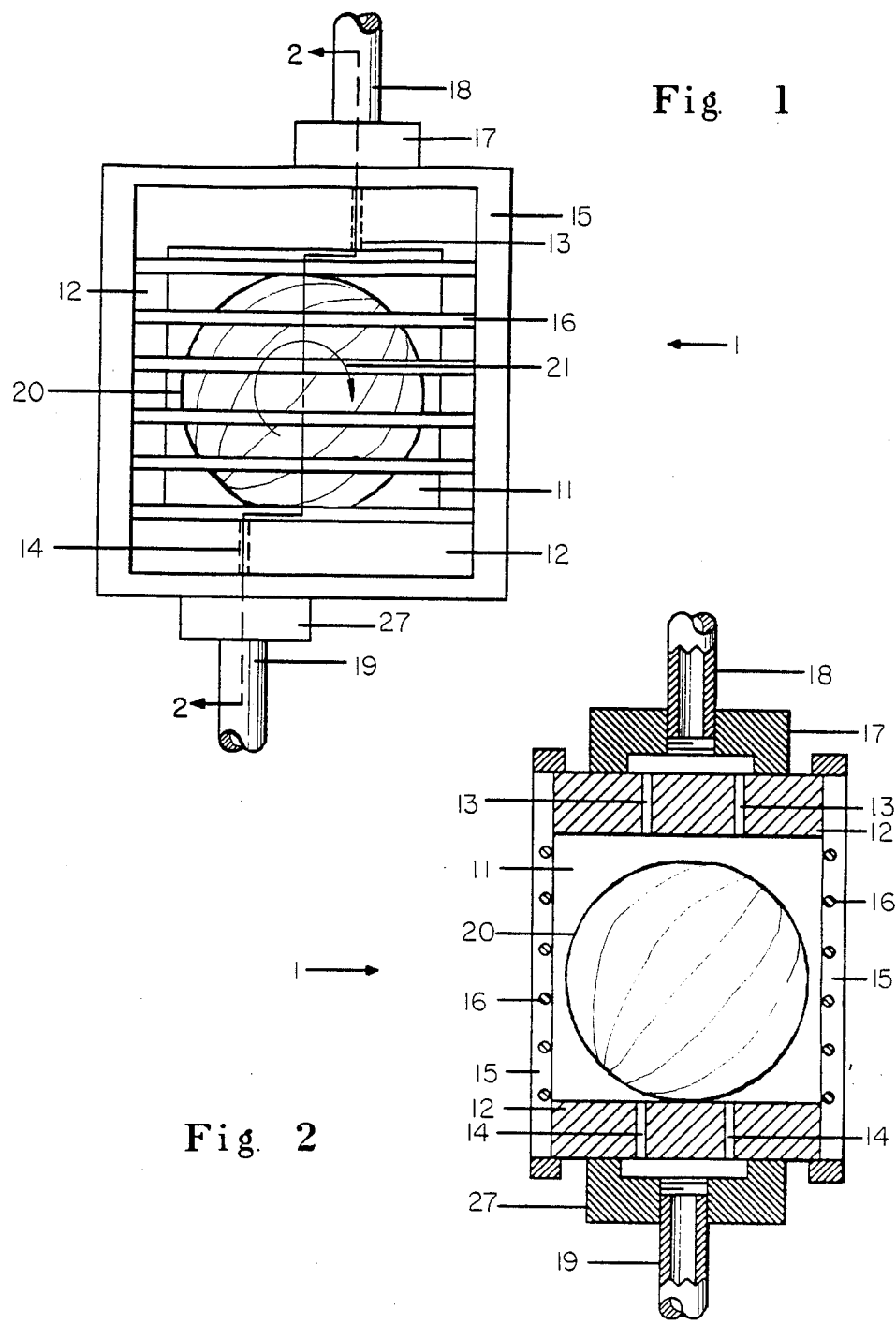
FIG. 1 is a front elevation view of a single fluid impingement chamber of the present invention shown with spherical fruit chunk loaded therein.
FIG. 2 is a cross-sectional side elevation view taken along section line 2—2 of FIG. 1.

A first preferred embodiment of the present invention is illustrated in FIGS. 1-4. Referring initially to FIGS. 1 and 2, a fluid impingement apparatus generally indicated as 1 includes fluid impingement chamber 11 defined by continuous side wall 12 and removable end brackets 15 which support screen wires 16. Fluid impingement apparatus 1 also includes upper and lower fluid distribution manifold blocks 17 and 27, and fluid distribution pipes 18 and 19 that are in fluid communication with a source of pressurized fluid (not shown). Extending from manifolds 17 and 27, through sidewall 12, and into chamber 11 are two pairs of orifices 13 and 14. These orifices direct fluid from manifold blocks 17 and 27, respectively, against fruit chunk 20 placed inside chamber 11. Pairs of orifices are preferable to individual orifices to better balance the fluid jet force acting on fruit chunk 20, which in turn balances fruit chunk 20 in the center of the chamber 11 during fluid impingement. An arrangement of orifices 13 and 14, as follows, combined with a diameter of substantially spherical fruit chunk 20 from 2.0 to 2.4 inches (5.1–6.1 cm), and a cubical chamber 11 with edge length from 2.5 to 3.0 inches (6.4–7.6 cm), provides an impingement moment 21 that causes fruit chunk 20 to spin when pressurized fluid is injected into chamber A first pair of side-by-side orifices 13 is offset preferably 0.5 inches (1.3 cm) along section line 2—2 from the center of 11. A second pair of side-by-side orifices 14, opposite chamber 11 from the first pair, is offset the same amount but on the opposite side of the center of chamber 11. In addition, both orifices within each pair are spaced from each other by preferably 1.0 inch (2.5 cm) and substantially equidistant from the center of chamber 11.

Figure 3:
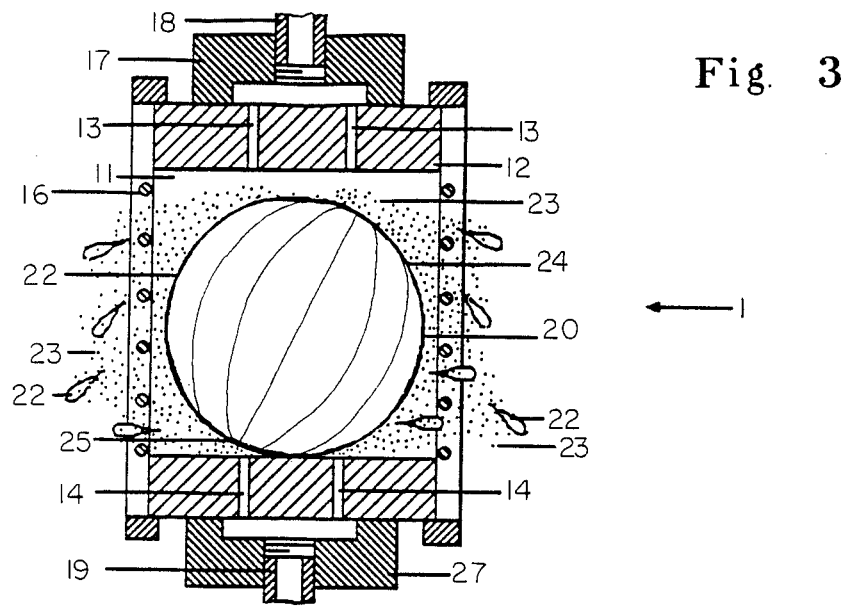
FIG. 3 is a cross-sectional side elevation view taken along section line 2—2 of FIG. 1, but showing the fruit chunk undergoing fluid impingement to strip and screen away the juice sacs.
Figure 4:
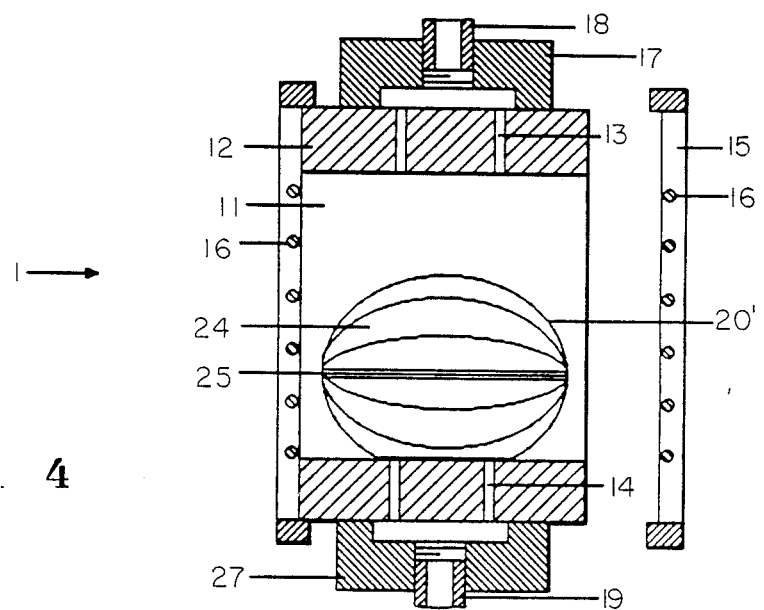
FIG. 4 is another cross-sectional side elevation view taken along section line 2—2 of FIG. 1 showing the remaining portion of a fruit chunk which has been completely stripped of juice sacs by the fluid impingement process and with one screen end of the chamber removed for discharging the remaining portion of the fruit chunk.

FIGS. 3 and 4 illustrate fluid impingement apparatus 1 in operation. First, a fluid that is preferably pressurized from 10 to 60 psig is injected into chamber 11 through orifice pairs 13 and 14. All orifices have a common diameter, preferably from 0.06 to 0.13 inches, and a length-to-diameter ratio preferably greater than 5:1. It is believed these orifice dimensional relationships act to columnate the exiting fluid streams to increase the impingement effectiveness against fruit chunk 20. As fruit chunk 20 is spun by moment 21, juice sacs 22 are stripped from radial membranes 24. It is believed that spinning not only exposes all portions of the fruit chunk 20 to the fluid streams, but also helps to clear away stripped juice sacs 22 and prevents radial membranes 24 from folding over onto themselves. The fluid along with stripped juice sacs 22 and some juice 23 from any juice sacs ruptured in the process are flushed from chamber 11 through screen wires 16 at both ends of chamber 11 where they are collected.

The impingement fluid is preferably compressed air which can easily be separated from juice sacs 22 and juice 23. Other fluids such as water, juice, or nitrogen can be used as well. Screen wires 16 are spaced far enough apart to allow juice sacs 22 to pass therebetween but close enough to retain the remaining portion of fruit chunk 20 within chamber 11. When fluid impingement is allowed to continue for preferably 1 to 6 seconds, the radial membranes 24 of fruit chunk 20 are stripped of substantially all juice sacs. The remaining portion of fruit chunk 20' will consist of radial membranes 24 left intact and attached to fruit chunk central stem 25 as illustrated in FIG. 4. The remaining portion of fruit chunk 20' is also intended to include radial membranes 24 that have some juice sacs remaining attached thereto along with some or all of the fruit chunk's seeds.

It is desirable for a juice sac and juice slurry to be as free of membrane contamination as possible. It is believed that pieces of membrane contribute to undesirable flavors found in juices obtained from most prior art juice extraction methods when the contaminated slurry is exposed to heat in the pasteurization process or when the juice and membranes are allowed to commingle for more than a few hours. In order to maximize the yield of juice sacs 22 from radial membranes 24 without shredding these membranes during fluid impingement, an optimum combination of conditions provides the best results. It has been found, for example, that to process a 2.3 inch (5.8 cm) diameter Valencia orange chunk, four orifices 0.06 inches in diameter, 0.5 inches long, with 40 psig filtered compressed air, a 2.5×2.5 inch cubical chamber 11, and a 4 second fluid exposure time, is one such optimum combination of conditions. Good juice sac stripping yield occurs in less than 1 second with four orifices 0.13 inches in diameter and 40 psig air, but consistency from orange to orange has greater variability than for the optimum combination. Good stripping yield occurs in 4 seconds with four orifices 0.13 inches in diameter and 10 psig air, but total air usage is substantially greater than for the optimum combination.

It has been found that the shape of chamber 11, as well as its orientation, have little impact on fluid impingement results when substantially spherically-shaped fruit chunks are processed; however, for nonspherical fruit chunks, a cylindrical chamber encourages fruit chunk spinning more readily. An advantage of the spherically-shaped fruit chunk over other shapes, besides being ideal for spinning, is the integrity of the radial membrane/stem connection. Other shapes, such as hemispheres, cubes, and wedges, have membranes which break away from the stem more easily, thereby potentially contaminating the juice and juice sac slurry.

An alternative to the preferred orifice arrangement uses at least one nozzle external to the fluid impingement chamber that directs a stream of fluid into the chamber through a screened end of the chamber instead of or in addition to side wall orifices.

If any outer membrane or peel remains on the surface of fruit chunk 20, the juice sacs 22 thereunder are generally not stripped from radial membranes 24. However, the process functions as intended on the exposed juice sac portion of fruit chunk 20. Cylindrical cored plugs from oranges with peel caps at each end, for example, are substantially stripped of juice sacs in a cylindrical chamber, with plug and chamber longitudinal axes being initially parallel.

Figure 5:
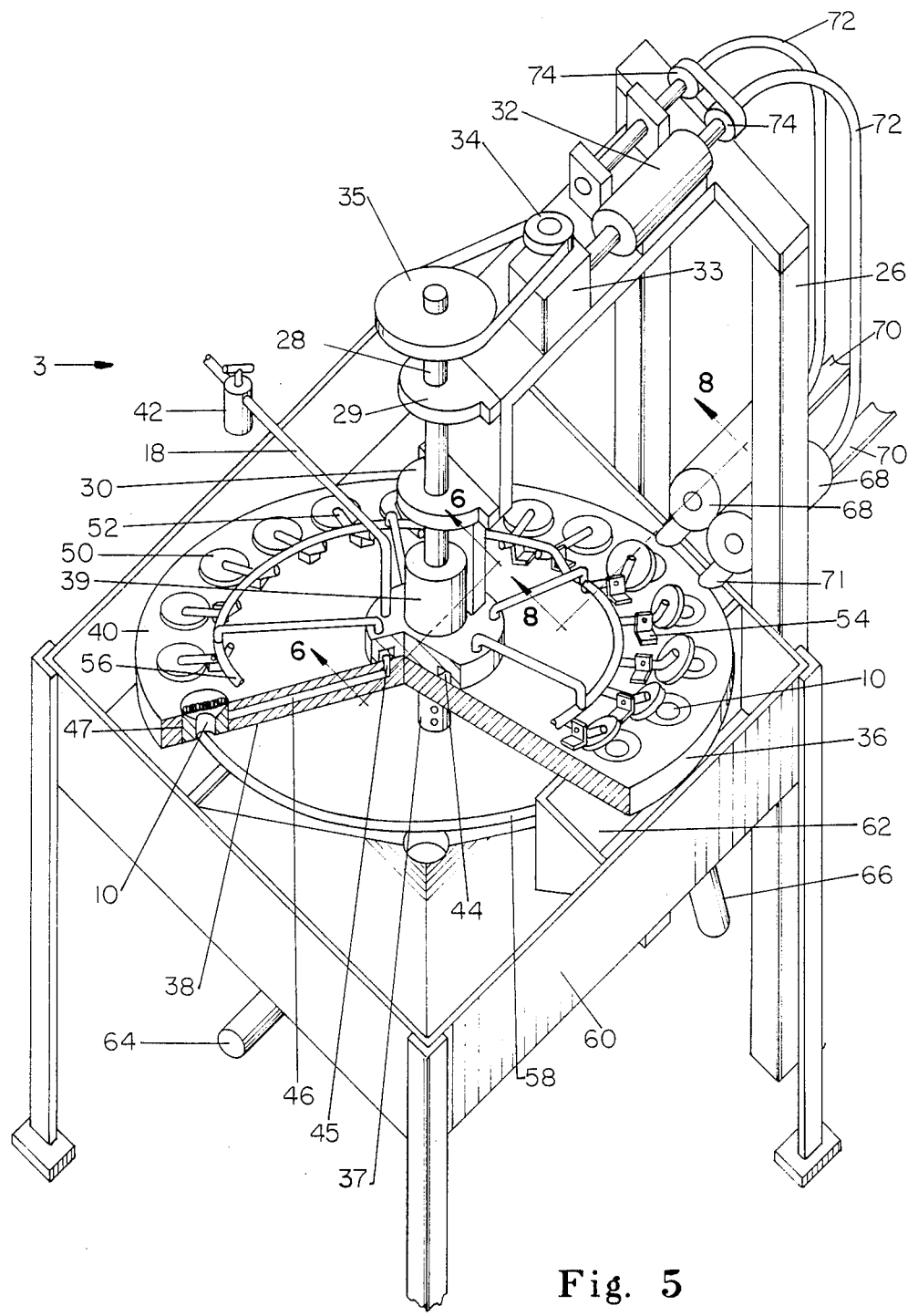
FIG. 5 is a simplified schematic perspective view of a particularly preferred continuous motion turret apparatus embodiment of the present invention.

A second preferred embodiment of the present invention is illustrated in FIGS. 5–8. This embodiment builds upon the first embodiment illustrated in FIGS. 1–4 by providing a plurality of fluid impingement chambers in a high speed production machine, generally indicated as 3, which satisfied the commercial objects of the invention. In FIG. 5, a floor-mounted frame 26 supports a vertically oriented shaft 28 journaled through bearings 29 and 30. Bearings 29 and 30 have locking collars (not shown), which prevent axial movement of shaft 28. Shaft 28 is driven by a drive train that includes, for example, motor 32 mounted on frame 26 through speed reduction gear box 33, belt pulley 34 mounted on the shaft extending from gearbox 33, and belt pulley 35 mounted to shaft 28. Wheel 36 is attached to the bottom of shaft 28 by means of hub 37 (FIG. 6) fastened to the underside 38 of wheel 36 and pinned or keyed to the end of shaft 28. A fluid distribution manifold 39, which is mounted to frame 26, rests against the upper surface 40 of wheel 36. Fluid from an external source (not shown) is piped to distribution manifold 39 through filter 42 and fluid pipe 18. Manifold 39 has a circular slot 44 (FIG. 7), preferably 240° in arc length, to which fluid pipe 18 is connected.

Wheel 36 has a plurality of fluid impingement chambers 10, equally spaced in a concentric pattern, with axes preferably parallel to the axis of wheel 36, extending from upper surface 40 of wheel 36 to lower surface 38 of wheel 36. Inward on the same radius lines as chambers 10, upper surface 40 of wheel 36 also has a concentric pattern of equally spaced holes 45, equal in number to the number of fluid impingement chambers, and at the same radius as that of slot 44 in manifold 39. A radial passage 46 extends from each hole 45 to a cylindrical insert 47 in wheel 36. Insert 47 has preferably cylindrical continuous side walls 48 which define each fluid impingement chamber 10. Radial passage 46 connects to orifice pairs 13 and 14 (shown in FIG. 8) extending through side walls 48 into chamber 10 of each insert 47.

In operation, as wheel 36 rotates, fluid flows from slot 44 of stationary manifold 39 through those holes 45 that are in fluid communication with slot 44 and from there via radial passages 46 to chambers 10 by way of orifice pairs 13 and 14 in side walls 48 of inserts 47. The other holes 45 that are not in fluid communication with slot 44 do not receive fluid until they pass under slot 44. In this way fluid impingement occurs in 2 out of 3 of the chambers 10 simultaneously, and each chamber receives fluid for the same length of time. With wheel 36 having a preferred diameter of 36 inches and preferably 20 fluid impingement chambers, a wheel speed of 10 RPM results in a fluid impingement time of 4 seconds for each chamber. When compressed air is preferably used as the impingement fluid, and there are preferably 4 orifices per chamber with each orifice being 0.06 inches in diameter, the total air flow is approximately 150 SCFM for 40 psig air pressure. These conditions are sufficient to substantially strip all juice sacs from a 2.0 inch (5.1 cm) spherical Valencia orange fruit chunk without substantially shredding the radial membrane of the fruit chunk.

It is possible that fluid could be continuously injected into all chambers; however, it is preferred in the present invention to interrupt flow during the loading of fruit chunks into chambers 10 and during the discharge of the remaining portions of fruit chunks from chamber 10. Such an arrangement minimizes fluid usage and improves stripped juice sac containment when the upper ends of chambers 10 are sequentially opened. A preferred fluid distribution system, illustrated in FIGS. 5, 6, and 7, has a minimum of parts which can be easily cleaned and sanitized.

Figure 6:
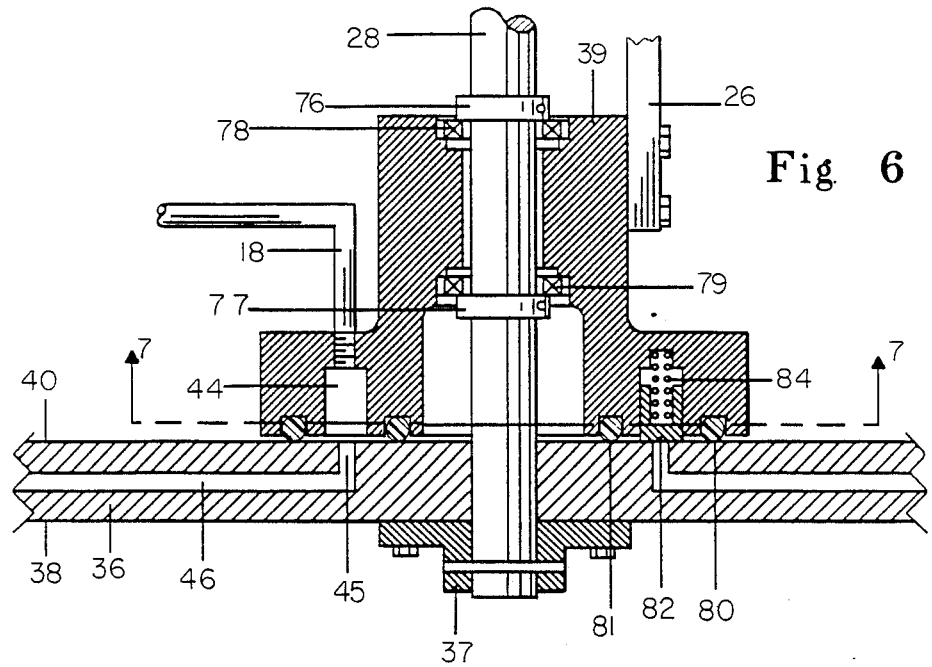
FIG. 6 is an enlarged cross-sectional side elevation view o taken along section line 6—6 of FIG. 5, showing the apparatus's fluid distribution system in detail.
Figure 7:
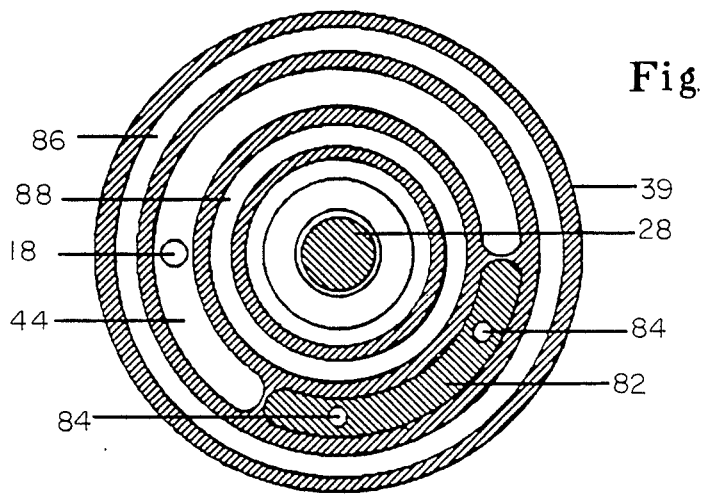
FIG. 7 is an enlarged cross-sectional bottom view, taken along section line 7—7 of FIG. 6, showing the circular arc passage of the fluid distribution manifold.

FIGS. 6 and 7 show how fluid distribution manifold 39 and wheel 36 interact. Manifold 39 is supported both by frame 26 and shaft 28. Collars 76 and 77 on shaft 28 maintain the vertical position of manifold 39 while frame 26 prevents rotation of manifold 39. Bearings 78 and 79 allow shaft 28 and shaft collars 76 and 77 to rotate while manifold 39 remains stationary. A gap is preferably maintained between manifold 39 and upper surface 40 of wheel 36, which is attached to shaft 28 by hub 37. O-rings 80 and 81 in circular slots 86 and 88 of manifold 39 seal manifold 39 against rotating wheel 36 such that fluid from slot 44 can only pass to holes 45 in wheel 36. To prevent fluid passing to holes 45 which are not directly under slot 44, a sliding block 82 of arc length preferably 110°, and of width greater than the diameter of holes 45, is spring-loaded by preferably two helical compression springs 84 from manifold 39 against upper surface 40 of wheel 36 to cover those holes 45 under sliding block 82.

Another method for delivering fluid intermittently to chambers 10 in a rotating wheel 36 uses an axially mounted rotary joint mounted at the lower end of shaft 28. The rotary joint connects stationary pipe 18 with radial pipes which extend from the rotating portion of the rotary joint to the orifices of fluid impingement chambers 10. A mechanically operated spool valve in each radial pipe is opened and closed to control fluid flow, for example, by a stationary cam.

Figure 8:
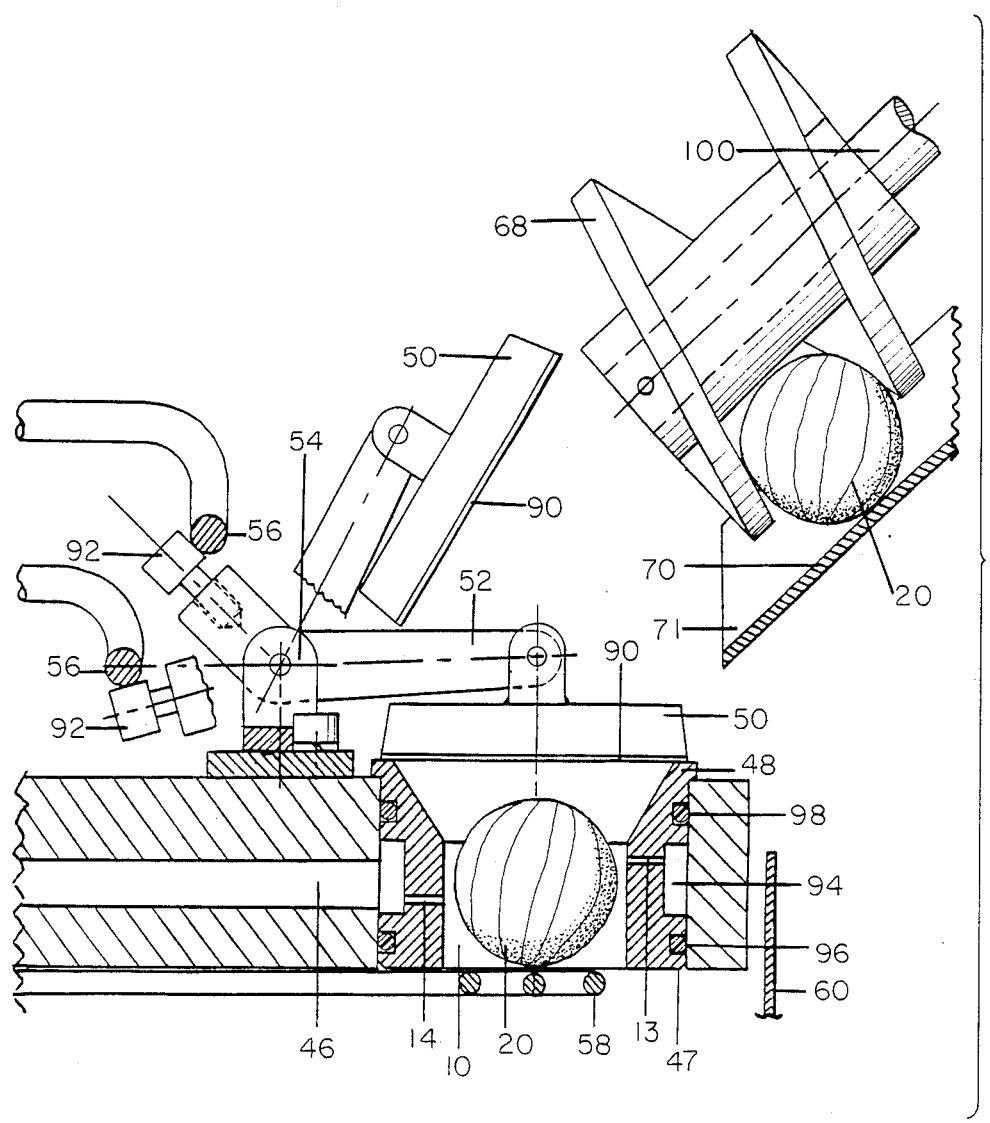
FIG. 8 is an enlarged cross-sectional elevation view taken along section line 8—8 of FIG. 5, showing a fluid impingement chamber in the rotating wheel along with a cammed coverplate mechanism mounted above the chamber, and an external screwfeeder and chute for loading a fruit chunk into the chamber as it passes below.

Fluid impingement chambers 10 have both upper and lower ends which correspond to the upper and lower surfaces of wheel 36. Wheel 36 has a thickness of preferably 150% of the largest fruit chunk diameter to be processed. Fruit chunks 20 are loaded by gravity into the upper ends of chambers 10. The remaining portions of fruit chunks 20 after the juice sacs have been stripped therefrom are discharged by gravity from the lower ends of chambers 10. During the fruit chunk loading operation a screen member 58 is preferably located at the lower end of chamber 10 to support the fruit chunk; and during the fluid impingement operation, the screen member remains under chamber 10 to support the fruit chunk. Also a cover 50 preferably closes the upper end of chamber 10 so that all stripped juice sacs and juice are discharged downward where they are collected. One way of closing the upper ends of chambers 10 is to rotate wheel upper surface 40 adjacent to a stationary plate (not shown) which covers the desired arc length of impingement chambers 10. Since this method may not adequately seal chambers 10 during fluid impingement, a preferred method is to provide an individual hinged coverplate 50 for each chamber 10 as shown in FIGS. 5 and 8. In FIG. 8, coverplate 50 is connected to pivot arm 52 which is hinged from pivot bracket 54 which is mounted to upper surface 40 of wheel 36. A cam rail 56, mounted from stationary manifold 39, first lowers against the rear end of pivot arm 52 to raise coverplate 50 at a location just ahead of where fruit chunk 20 is loaded into chamber 10. After loading, stationary cam rail 56 has a rise zone to permit the weight of coverplates 50 to sequentially lower themselves onto the tops of inserts 47 to seal upper ends of chambers 10, as illustrated in FIGS. 5 and 8.

Underneath chambers 10, FIG. 5 shows rails 58 which are spaced preferably within 0.06 inches from lower surface 38 of wheel 36. Rails 58 are wide enough and spaced apart sufficiently to function as screen members. Screening allows passage of juice sacs 22 therethrough but not the remaining portions of fruit chunks 20. Rails 58 are stationary and preferably 300° in arc length. Rails 58 are attached at one end of the side of open tank 60 and at the other end to the side of hopper 62. Their arc begins under impingement chambers 10 where several coverplates are in the fully opened position. During the fluid impingement operation, juice sacs 22, juice 23, and fluid flow through rails 58 and into tank 60, which has central drain hole and discharge pipe 64. After fluid impingement has been discontinued at each chamber 10, and at the termination of rails 58, the remaining portion of fruit chunk 20 drops out of chamber 10 into hopper 62. Hopper 62 has a discharge pipe 66.

When commonly sized and shaped articles are continuously choke fed to a turret-type machine, one method used for controlling the position and feed timing of each article is screwfeeding. Two screwfeeders 68 and infeed chutes 70 mounted to frame 26 are shown in FIG. 5. Each screwfeeder 68 loads a fruit chunk into every other impingement chamber 10 as wheel 36 rotates. Two screwfeeders permit fruit chunks to be fed from two different sources without the need for merging the delicate fruit chunks ahead of the fluid impingement process. Each of the screwfeeders must have their flights timed with the passing of open impingement chambers in order to reliably load one fruit chunk into each chamber. In this preferred embodiment two screwfeeders 68 are each driven by a flexible cable 72 from a drive train 74 connected to motor 32, which is the same motor that drives shaft 28. In this drive arrangement each screwfeeder 68 rotates one revolution for every tenth of a revolution of wheel 36, or for every two of chambers 10 that pass under each screwfeeder. Screwfeeder 68 has a pitch preferably somewhat larger than the diameter of the largest of spherical fruit chunks 20 to be processed. As screwfeeder 68 rotates, a fruit chunk 20 is moved along chute 70 to drop point 71. Fruit chunk 20 then drops by gravity into chamber 10 of wheel 36 passing underneath drop point 71.

FIG. 8 illustrates insert 47, coverplate 50, and screwfeeder 68 more clearly than FIG. 5. Coverplate 50 is hinged from pivot arm 52 so that it self-aligns with the top of insert 47 over impingement chamber 10 when closed. Additionally, resilient surface 90, preferably 0.06 inch thick silicone rubber sheetstock, bonded to the underside of coverplate 50 preferably by means of silicone rubber adhesive, helps to seal closed the upper end of chamber 10. Cam follower 92 is mounted to the rear end of pivot arm 52 to ride against stationary cam rail 56 with rolling friction. Cam rail 56 lifts coverplate 50 far enough for fruit chunk 20 to be dropped into chamber 10 by screwfeeder 68 and chute 70. The upper end of chamber 10 is countersunk preferably about one inch deep to provide a larger target for the dropping of fruit chunk 20 than is provided by the diameter of the cylindrical lower end of chamber 10.

Side walls 48 of cylindrical insert 47 have a 360° peripheral groove 94 which connects orifice pairs 13 and 14 to radial passage 46 in wheel 36. Opposing orifices, offset from the center of chamber 10, can be directed into chamber 10 from any position about the axis of chamber 10 and still receive fluid from groove 94. O-rings 96 and 98 in insert 47 seal both sides of groove 94 to prevent leakage of fluid around insert 47.

When juice sacs 22, juice 23, and fluid pass from chamber 10 through rails 58 to tank 60, fluid, which is preferably a gas, will separate by gravity from juice sacs 22 and juice 23 and flow out of the upper end of tank 60 through the gap between wheel 36 and walls of tank 60. If a liquid, the fluid will instead pass with juice sacs 22 and juice 23 to pipe 64 in tank 60.

Screwfeeder 68 is attached to shaft 100, which is cantilevered from bearings (not shown) attached to frame 26. The cantilevered arrangement of shaft 100 permits the screwfeeder 68 and drop point 71 of chute 70 to be located as close as possible to the open impingement chambers 10 to reliably gravity load these chambers. Shaft 100 is directly coupled to flexible shaft 72, shown in FIG. 5.

In the second preferred embodiment of the present invention just described, the fluid impingement time and fluid pressure are held constant for a given wheel speed. Since these same pressure and time variables determine how thoroughly juice sacs can be stripped without shredding the radial membranes for a given size fruit chunk, optimum operation occurs when all fruit chunks are commonly sized. A spherical coring apparatus and process, described in copending and commonly assigned U.S. patent application Ser. No. 291,920 entitled "Method and Apparatus for Extracting Fruit Meat and Juice from a Fruit", filed Dec. 29, 1988, which is incorporated herein by reference, produces commonly-sized spherical fruit chunks, with high overall meat extraction yield and equality. One embodiment of the spherical coring machine is expected to produce spherical fruit chunks at a rate of 100 per minute. For optimum production, a preferred extraction system has two such spherical coring machines feeding spherical fruit chunks directly into one fluid impingement wheel.

Figure 9:
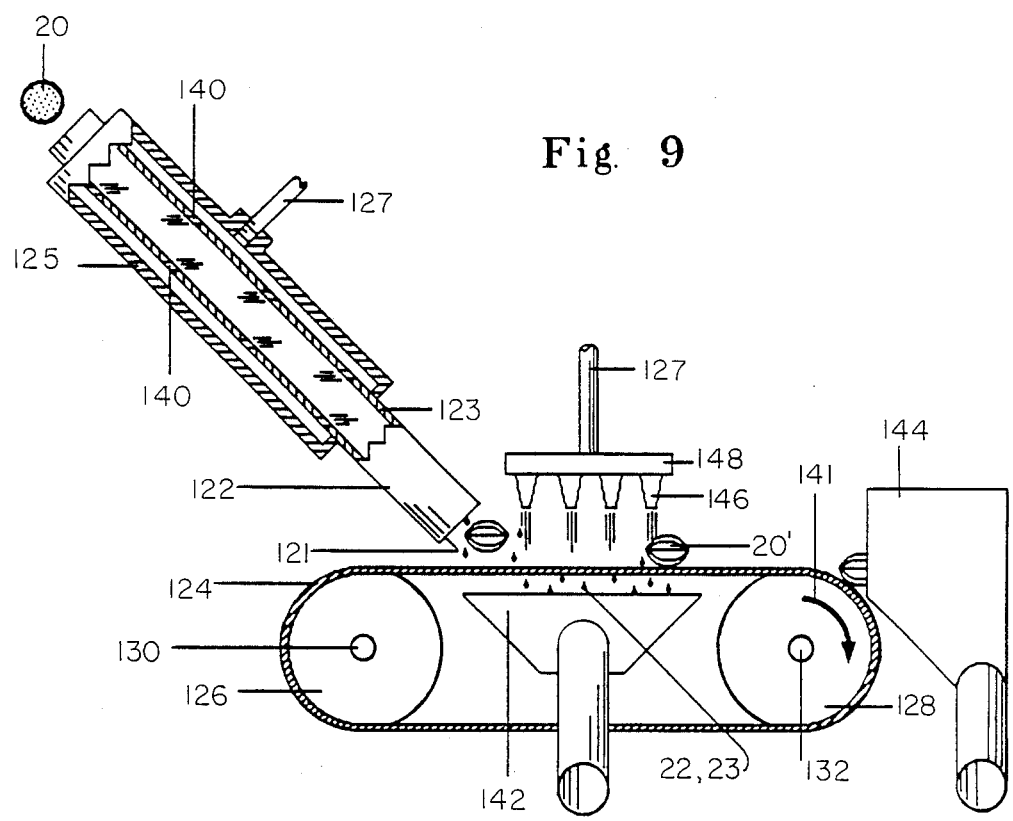
FIG. 9 is a schematic side elevation view showing an angled fluid impingement tube and a screen-like conveyor at the lower end of the tube for separating juice and juice sacs from remaining portions of fruit chunks.

In a third preferred embodiment of the present invention, illustrated in FIG. 9, fruit chunks 20 are inserted one at a time by hand, or alternatively metered by the screwfeeder 68 and a chute 70 of FIG. 8, for example, into the open end 120 of inclined hollow tube 122. Hollow tube 122, with continuous side walls 123, is supported by a floor-mounted frame (not shown). Tube 122 is preferably 3-6 feet (0.9-1.8 m) long, with preferably a cylindrical internal cross-section about 20% to about 50% greater than the diameter of the largest of fruit chunks 20 to be processed. Tube 122 is inclined from the horizontal preferably between 30° to 60°, above and toward substantially horizontal, screen-like conveyor belt 124. The lower end 121 of tube 122 is preferably one to two fruit chunk diameters above conveyor belt 124. Conveyor belt 124 runs around two pulleys 126 and 128, which are attached to shafts 130 and 132, respectively. Shafts 130 and 132 are supported by the same frame (not shown) which supports tube 122. Shaft 132, attached to head pulley 128, is driven by a drive means (not shown), such as a constant speed A/C motor and gear reducer.

Surrounding the central portion of tube 122 is a first pressurized fluid distribution manifold 125, which is connected by pipe 127 to a source (not shown) of pressurized fluid, preferably 60 psig compressed and filtered air. A plurality of fluid impingement orifices 140 extend through the side walls 123 of tube 122. Orifices 140 are preferably staggered from side to side and angled with respect to the centerline of tube 122 to inject fluid into tube 122 such that the fluid impinges against and causes fruit chunk 20 to spin as it translates, by sliding or rolling, past orifices 140. Preferably 4 to 12 orifices, 0.06 inches to 0.13 inches in diameter, are spaced 3-6 inches (7.6-15.2 cm) apart along the length of tube 122. The speed of fruit chunk translation, the pressure of fluid, and the number and size of the orifices 140 determine the degree to which the fruit chunk 20 will be stripped of juice sacs 22 as it passes through tube 122. Because of the short time during which fruit chunks 20 can be exposed to a reasonable number of stationary orifices in tube 122, this embodiment is preferably operated for only partial extraction of juice sacs. That is, the inner juice sacs and seeds located near the central stem of the fruit chunk may not be removed from the radial membranes of the fruit chunk by this preferred embodiment of the present invention.

The fluid impingement process illustrated in FIG. 9 results in the fluid, stripped juice sacs 22, juice 23, and the remaining portion of fruit chunks 20' all exiting tube 122 from its discharge end 121. Screen-like conveyor 124 acts to separate the fluid, juice 23, and juice sacs 22 from remaining portion of fruit chunk 20' by slowly moving under discharge end 121 in the direction shown by arrow 141. The openings in screen-like conveyor 124 do not allow remaining portion 20' to pass therethrough. Underneath conveyor belt 124 is a first stationary collection hopper 142. Juice sacs 22 and juice 23 fall through the openings in screen-like belt 124 and into hopper 142. Remaining portions of fruit chunk 20' are then conveyed to second stationary collection hopper 144 at conveyor head pulley 128. As conveyor belt 124 passes over head pulley 128, remaining portions of fruit chunk 20' drop into hopper 144. To assist removal of already stripped juice sacs 22 from remaining portions 20', and to flush off conveyor belt 124, fluid jets 146 are preferably used. A plurality of fluid jets 146 are mounted above conveyor belt 124 near the discharge end 121 of tube 122. These jets are fed pressurized fluid from a second fluid distribution manifold 148 which is connected to pipe 127 from the fluid source. The pressurized fluid is preferably a gas so that it separates by gravity from the slurry of juice and juice sacs in hopper 142.

Alternatives to a screen-like belt conveyor 124 include a vibrating screen conveyor and a rotating disk screen. All that is required is a screening means to pass juice sac 22 therethrough and a means for moving remaining portions of fruit chunks 20' away from the discharge end 121 of impingement tube 122. Even a tilted stationary screen, down which remaining portions of fruit chunks 20' will roll or slide, could be used.

It is thought that the fluid impingement methods and apparatuses for fruit meat extraction of the present invention, and many of their attendant advantages, will be understood from the foregoing description; and it will be apparent that various changes and modifications may be made in form, construction, and arrangement without departing from the spirit and scope of the invention or sacrificing its material advantages, the forms hereinbefore described being merely preferred or exemplary embodiments thereof.

What is claimed is:

1. An apparatus for separating juice sacs from the radial membranes of a peeled chunk of fruit, said apparatus comprising:
   (a) a fluid impingement chamber for accommodating said peeled fruit chunk such that said peeled fruit chunk is free to rotate;
   (b) means for inserting said peeled fruit chunk into said fluid impingement chamber;
   (c) means for injecting a pressurized fluid into said chamber
   (d) such that said fluid impinges against and imparts a moment to said peeled fruit chunk, whereby said juice sacs are stripped from said radial membranes of said fruit chunk.

2. The apparatus recited in claim 1 wherein said fluid impingement chamber is defined by a continuous side wall and at least one end covered by a screen member.

3. The apparatus recited in claim 1 wherein said fluid impingement chamber has a centerline, and wherein said fluid impinging means is offset from said centerline.

4. The apparatus recited in claim 1 wherein said fluid impingement chamber is defined by an inclined hollow tube.

5. The apparatus recited in claim 4 wherein said inclined hollow tube has a centerline, and wherein said fluid impingement means is angled with respect to said centerline.

6. An apparatus for separating juice sacs from the radial membranes of a chunk of fruit, said apparatus comprising:
   (a) a frame;
   (b) a shaft rotatably attached to said frame;
   (c) means for rotating said shaft;
   (d) a wheel connected to said shaft, said wheel having upper and lower parallel surfaces;
   (e) a plurality of fluid impingement chambers mounted within said wheel, each chamber having a continuous sidewall and open ends at said upper and lower wheel surfaces;
   (f) a screen member mounted to said frame under and in close proximity to said open lower ends of said fluid impingement chambers;
   (g) means for inserting said fruit chunk into said open upper end of said fluid impingement chamber;
   (h) means for sequentially covering said open upper ends of said fluid impingement chambers after said fruit chunk is inserted therein;
   (i) means for distributing pressurized fluid to each of said fluid impingement chambers; and
   (j) means for injecting said pressurized fluid into each chamber, whereby said fluid impinges against said fruit chunk and strips said juice sacs from said radial membranes of said fruit chunk.

7. The apparatus of claim 6 wherein said fluid distribution means comprises:
   (a) a fluid distribution manifold connected to said frame, said manifold having a bottom surface parallel to and spaced in close proximity to said upper surface of said wheel;
   (b) a circular pattern of holes in said upper surface of said wheel, said hole pattern having a radius, a first portion of holes, and a second portion of holes;
   (c) a first circular slot in said bottom surface of said manifold, said first slot having a centerline radius substantially equal to said radius of said pattern of holes and a length covering said first portion of said holes;
   (d) means for sealing between said manifold bottom surface and said upper surface of said wheel, whereby said pressurized fluid passes only from said first manifold slot to said first portion of said holes in said upper face of said wheel as said wheel rotates;
   (e) passages in said wheel connecting each of said holes in said upper surface of said wheel to said fluid injection means;
   (f) a second circular slot in said bottom surface of said manifold, said second slot having a centerline radius substantially equal to said centerline radius of said first slot and a length covering said second portion of said holes;
   (g) a slidable block extending from said second slot and covering said second portion of said hole pattern in said upper surface of said wheel; and
   (h) means for urging said slidable block against said upper surface of said wheel, thereby substantially closing said second portion of said hole pattern in contact with said block to said pressurized fluid as said wheel rotates.

8. The apparatus recited in claim 6 wherein said fruit meat inserting means comprises:
   (a) at least one screwfeeder; and
   (b) a chute under and in close proximity to said screwfeeder, said chute mounted to said frame and having a drop point above said impingement chambers in said wheel.

9. The apparatus recited in claim 6 wherein said means for injecting said pressurized fluid into each of said chambers includes at least one orifice in said continuous sidewall.

10. The apparatus recited in claim 9 wherein each of said chambers has a centerline and wherein said at least one orifice is offset with respect to said centerline.

11. The apparatus recited in claim 6 wherein said means for covering said open upper ends of said chambers comprises a coverplate, a follower attached to said coverplate, and a cam member slidably engaging said follower.

* * * * *

UNITED STATES PATENT AND TRADEMARK OFFICE
CERTIFICATE OF CORRECTION

PATENT NO. : 4,977,826

DATED : December 18, 1990

INVENTOR(S) : R.W. Kock; P.G. Gosselin, H.N. Reiboldt

It is certified that error appears in the above-identified patent and that said Letters Patent is hereby corrected as shown below:

Column 1, line 15, after "fruit" delete -- o -- .

Column 5, line 54, after "view" delete -- o -- .

Column 6, line 58, after "chamber" insert -- 11. -- .

Claim 1, line 21, delete "(d)".

Signed and Sealed this

Seventh Day of July, 1992

*Attest:*

DOUGLAS B. COMER

*Attesting Officer*     Acting Commissioner of Patents and Trademarks